United States Patent
Sampath et al.

(10) Patent No.: US 11,669,647 B1
(45) Date of Patent: Jun. 6, 2023

(54) PHYSICAL KEY CARTRIDGE FOR RACK-MOUNTED COMPONENT

(71) Applicant: Amazon Technologies, Inc., Seattle, WA (US)

(72) Inventors: Shreyas Sampath, Seattle, WA (US); Jason Harland, Seattle, WA (US); Max Jesse Wishman, Seattle, WA (US); Christopher S. Beall, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 744 days.

(21) Appl. No.: 16/669,229

(22) Filed: Oct. 30, 2019

(51) Int. Cl.
| | |
|---|---|
| *G06F 21/86* | (2013.01) |
| *H05K 7/14* | (2006.01) |
| *H04L 9/08* | (2006.01) |
| *H01R 13/627* | (2006.01) |
| *H01R 13/631* | (2006.01) |
| *H01R 33/945* | (2006.01) |
| *G06F 21/60* | (2013.01) |

(52) U.S. Cl.
CPC ............ *G06F 21/86* (2013.01); *G06F 21/602* (2013.01); *H01R 13/6272* (2013.01); *H01R 13/631* (2013.01); *H01R 33/945* (2013.01); *H04L 9/0897* (2013.01); *H05K 7/1489* (2013.01)

(58) Field of Classification Search
CPC ... G06F 21/86; G06F 21/602; H01R 13/6272; H01R 13/631; H01R 33/945; H04L 9/0897; H05K 7/1489

USPC .......................................................... 713/194
See application file for complete search history.

(56) References Cited

U.S. PATENT DOCUMENTS

| | | | | |
|---|---|---|---|---|
| 10,563,429 | B1* | 2/2020 | Bailey | E05B 35/008 |
| 2013/0269404 | A1* | 10/2013 | Krymchenko | A45C 11/328 |
| | | | | 70/456 R |
| 2016/0180314 | A1* | 6/2016 | Zemek | G06Q 20/4015 |
| | | | | 705/76 |
| 2020/0177564 | A1* | 6/2020 | Arisankala | H04L 63/166 |

FOREIGN PATENT DOCUMENTS

WO WO-2017196319 A1 * 11/2017

\* cited by examiner

*Primary Examiner* — Sanchit K Sarker
(74) *Attorney, Agent, or Firm* — Kilpatrick Townsend & Stockton LLP

(57) ABSTRACT

A system can include a key cartridge, which can include a housing, an enabling key component, and an electrical connector. The housing may be sized for placement at least partially over or around a latch release mechanism of a slidable rack sled and in a position to obstruct access to the latch release mechanism. The enabling key component can be positioned within the housing and enable operation of an electrical component situated within the slidable rack sled. The electrical connector can be coupled with the enabling key component and sized and positioned for establishing electrical connection between the enabling key component and the electrical component situated within the slidable rack sled when the pluggable key cartridge is installed relative to the server rack sled.

17 Claims, 5 Drawing Sheets

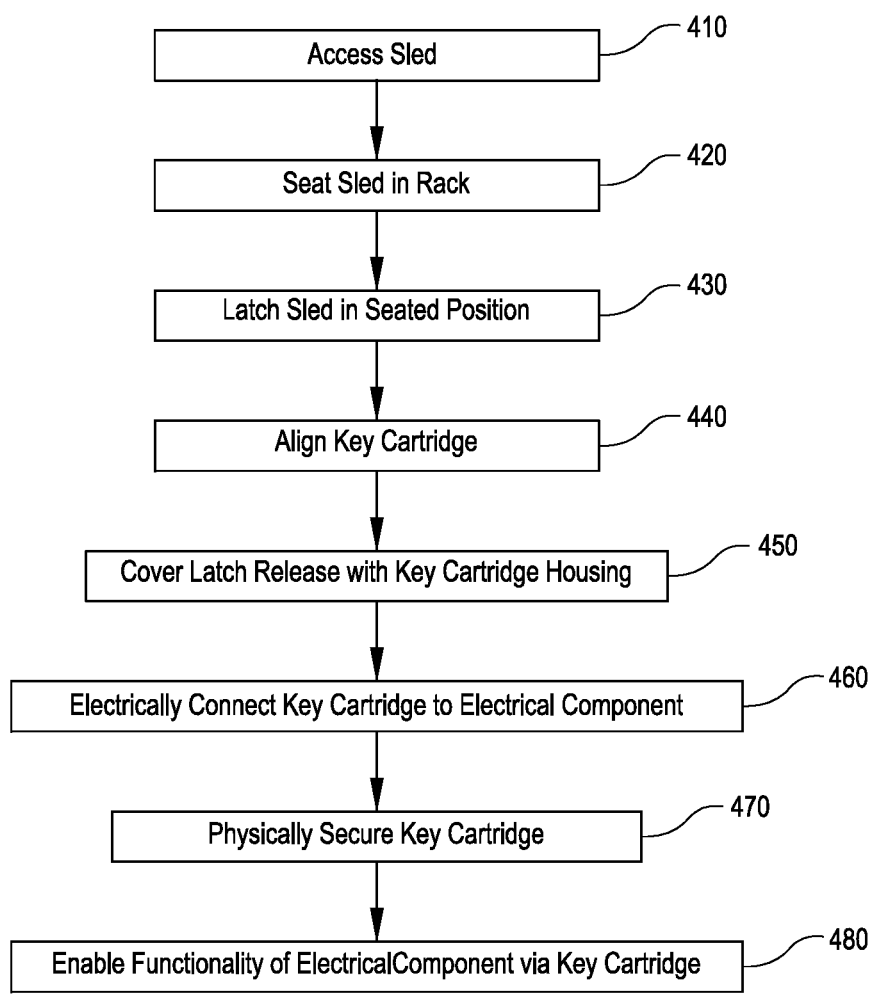

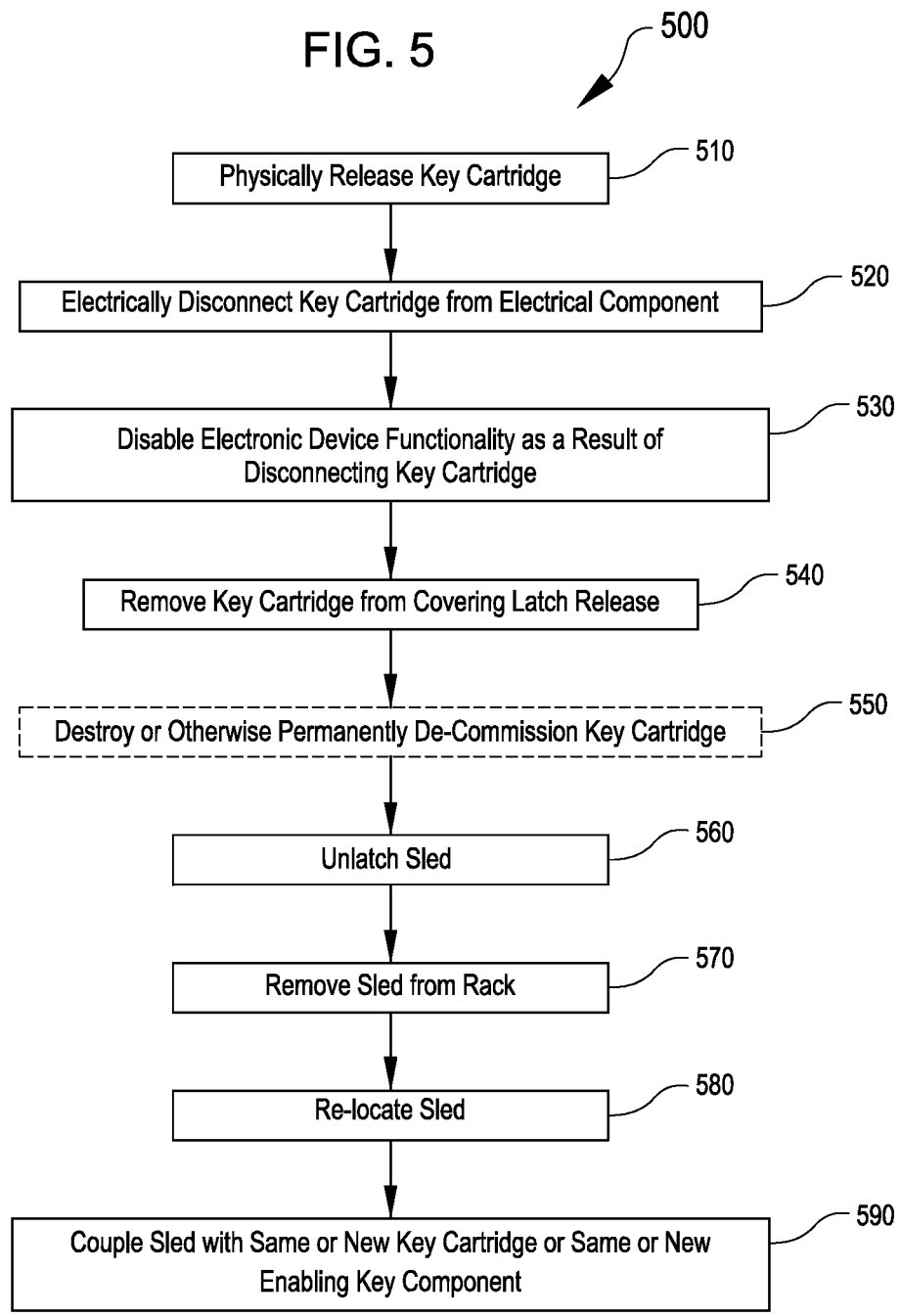

PHYSICAL KEY CARTRIDGE FOR RACK-MOUNTED COMPONENT

BACKGROUND

In an era of ever-increasing reliance on data stored within a computing infrastructure, physical security of computer processing assets is an important consideration. Authorization, security, and/or monitoring features implemented through software components may provide reasonable protection against attempts to digitally access information from hard drives or other physically discrete storage medium while connected to a network. During transit of such hard drives from place to place or when otherwise not connected to a network, however, such software components may be limited in ability to guard against scenarios in which a hard drive may be physically intercepted for the purpose of accessing the drive or tampering with its hardware components.

BRIEF DESCRIPTION OF THE DRAWINGS

Various embodiments in accordance with the present disclosure will be described with reference to the drawings, in which:

FIG. 4 is a flowchart illustrating an example process involving installation of a key cartridge according to certain embodiments; and FIG. 5 is a flowchart illustrating an example process involving removal of a key cartridge according to certain embodiments.

DETAILED DESCRIPTION

Figure 1:
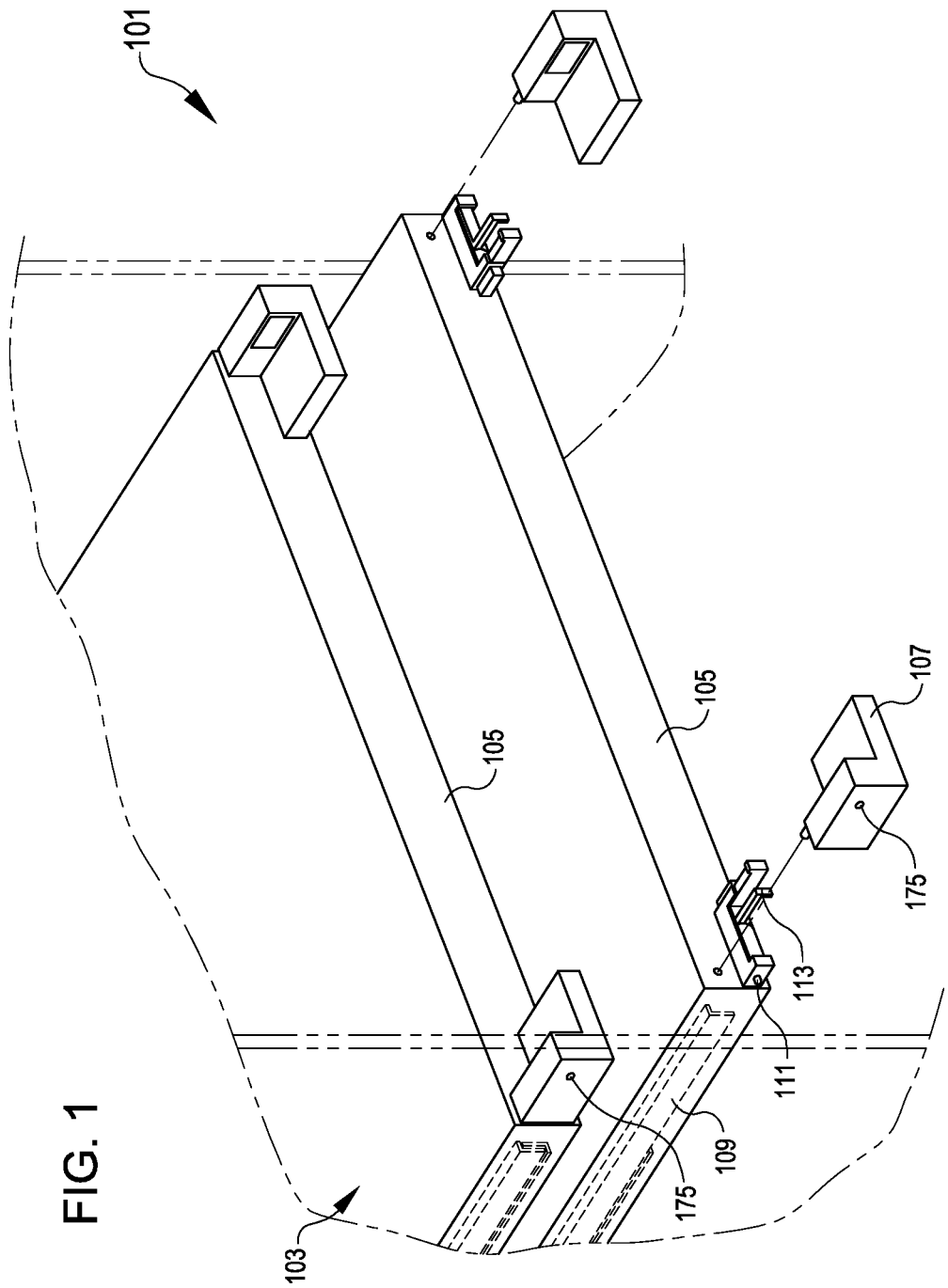
FIG. 1 is a perspective view of a rack that may be used within a datacenter or other facility according to certain embodiments.

Technologies described herein relate to security features that may be implemented relative to computer servers or other appliances received in a rack, such as may be used in data centers or other locations. A respective appliance may be situated within a sled that can slide out of the rack, such as to either allow full removal of the sled with the appliance or to instead permit temporary physical access to the appliance before the sled is slid back into the rack. A latch mechanism may retain the sled in the rack.

A key cartridge may be installed in a position that covers a lever or other release mechanism for the latch. Installing the key cartridge can also establish an electrical connection between the appliance and an enabling key component within the key cartridge. The enabling key component may include a decryption key or other element without which the appliance cannot properly function. Thus, for example, the enabling key component may allow data on the appliance to be decrypted and used as long as the key cartridge is in place. The key cartridge's installed positioning over the latch release mechanism may accordingly prevent the sled from being removed without first disabling data decryption on the appliance or otherwise causing the application to be disabled by the removal of the key cartridge. Accordingly, removal of the key cartridge (e.g., to gain access for removing the appliance from the rack) may disable the appliance prior to the appliance's removal from the rack (e.g., such that the appliance is secure against its contents being accessed, during transit or otherwise, by any individual lacking the key cartridge or a suitable replacement).

Removing the key cartridge to gain access for removing the appliance may also result in a user being faced with a decision about what to do with the removed key cartridge. In some embodiments, such a decision may allow the user to send the appliance and the key cartridge separately to a target destination (e.g., thus improving security of the transfer and reducing a possibility of the appliance being accessible if intercepted). In some embodiments, such a decision may prompt a user to destroy the key cartridge or a pertinent component thereof so that the appliance is more secure for transit in light of the original key cartridge being unavailable for misuse and the appliance only being accessible if an appropriate replacement key cartridge is available. (In some cases, the original key cartridge may be unique and therefore irreplaceable.) For example, the key cartridge may include a screw or other element that can be driven through to pierce or otherwise destroy a pertinent component. Such a destruction mechanism may be operated by an interface that is obstructed by the sled or rack while the key cartridge remains installed, which placement may guard against inadvertent operation of the destruction mechanism that might prematurely disable functionality of the associated appliance.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 depicts a system 101, for example, which may be used within a datacenter or other environment according to certain embodiments. The system 101 as shown in FIG. 1 includes a rack 103, sleds 105, and key cartridges 107. Although multiple sleds 105 and key cartridges 107 are shown in FIG. 1, any suitable number of one or more may be utilized, and for ease of reference herein, discussion will primarily refer to these and other elements in the singular form.

The rack 103 may be a server rack, and the sled 105 may be a server rack chassis, for example. The rack 103 in FIG. 1 is shown with rails 109 by which the sled 105 is slidably movable relative to the rack 103, although the rack 103 additionally or alternatively can include any suitable structure for releasably receiving and supporting the sled 105. For example, the rack 103 may include suitable vertical struts, walls, and/or other structures that may support the rails 109 or otherwise support the sled 105 and/or form an enclosure about the sled 105.

The sled 105 may alternatively be referred to as a rack sled or a slidable rack sled. The sled 105 can include a latch member 111 that secures the sled 105 to the rack 103, such as in a fully seated position (e.g., as depicted in the topmost sled 105 in FIG. 1). In some embodiments, the latch member 111 may secure the sled 105 to another sled 105 that is in turn secured to the rack 103, or the latch member 111 may otherwise couple the sled 105 directly or indirectly with the rack 103. The latch member 111 can be coupled with a latch release mechanism 113 to allow the latch member 111 to be released. For example, releasing the sled 105 may allow the sled 105 to slide out of the rack 103 (e.g., as depicted in the bottommost sled 105 in FIG. 1).

In FIG. 1, the latch member 111 is depicted as a pin member that can engage a mating opening in the rack 103, while the latch release mechanism 113 is depicted as an arm attached to the pin and operable to move the pin out of engagement, for example, against the bias of a spring or other biasing member. The latch member 111 and latch release mechanism 113, however, can include any lever, arm, button, or other suitable structure or interface for performing their respective functions, and may correspond to or interact with structure incorporated into the sled 105 and/or the rack 103.

Figure 2A:
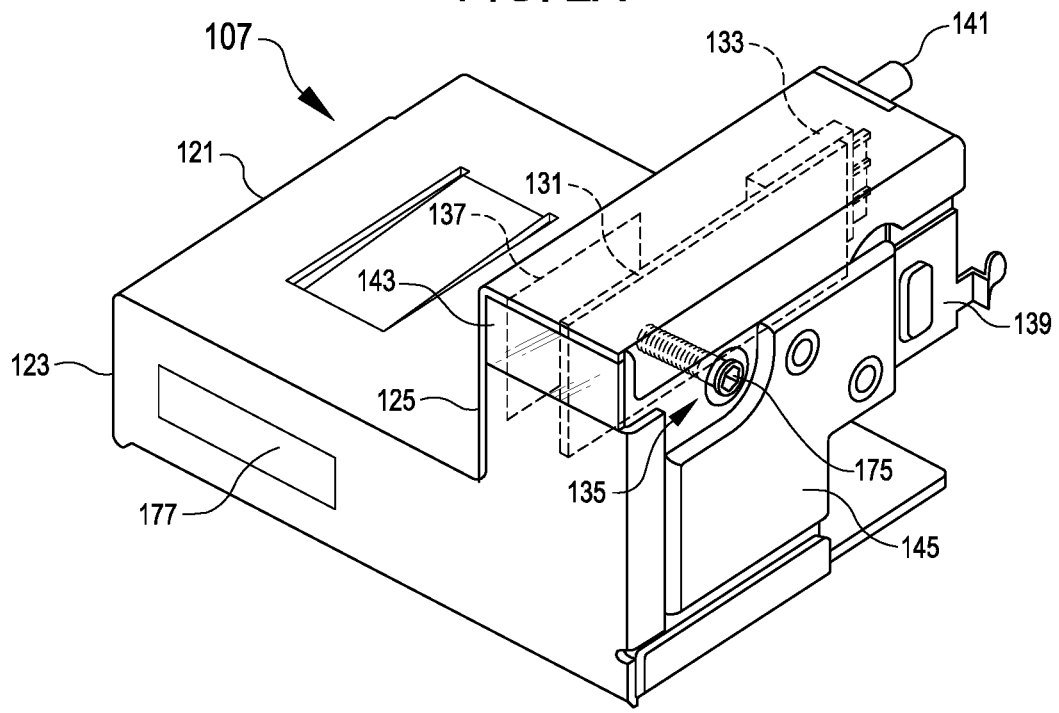
FIGS. 2A and 2B are respectively front and rear perspective views of an example of a key cartridge that may be used with the rack of FIG. 1 according to certain embodiments.
Figure 2B:
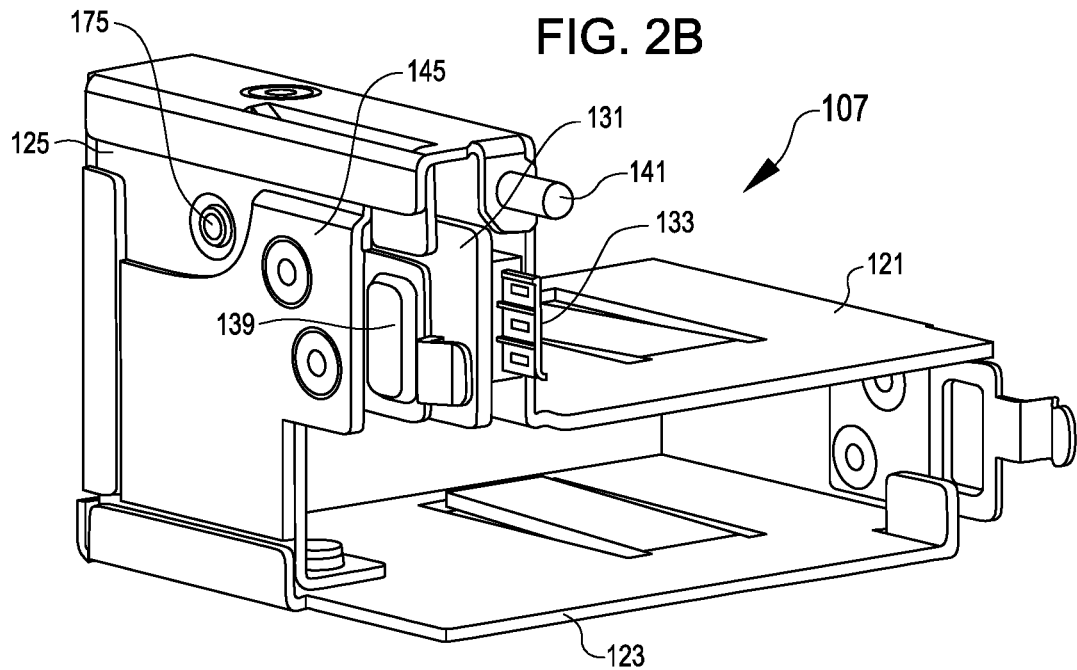

FIGS. 2A and 2B shows an example of a key cartridge 107. The key cartridge 107 can include a housing 121. The housing 121 in FIGS. 2A and 2B includes a base portion 123 and an extension portion 125. The base portion 123 can be sized to fit over or around the latch release mechanism 113. The extension portion 125 can include other components to interact with other elements of the system 101. Although the extension portion 125 is shown extending upward from the base portion 123, downward, sideward, or other orientations may be utilized according to the respective placement of other elements with which the key cartridge 107 will interact.

In FIGS. 2A and 2B, the extension portion 125 includes or is coupled with various other elements. Examples include an enabling key component 131, an electrical connector 133, a destruction mechanism 135, a visual indicator 137, a locking member 139, an alignment feature 141, an indicator light 143, and a reinforcing plate 145. Various of these elements may best be understood within the further context of FIG. 3.

Figure 3:
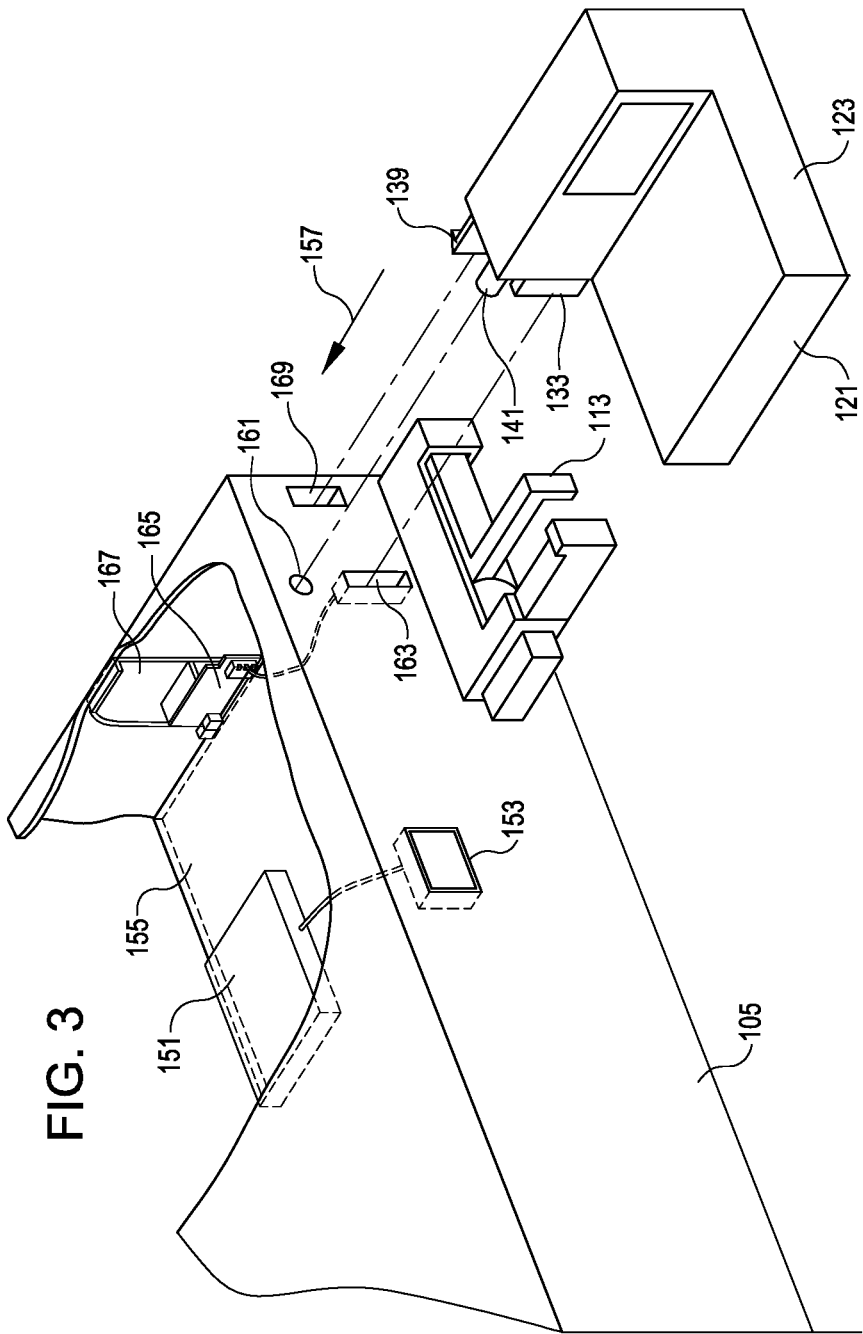
FIG. 3 is a perspective view of a portion of a sled that may receive the key cartridge of FIGS. 2A and 2B according to certain embodiments.

FIG. 3 shows an example of features of the sled 105 that interact with features of the key cartridge 107. In FIG. 3, a portion of the sled 105 is cut away from view and reveals an electrical component 151 contained by the sled 105. The electrical component 151 may correspond to a hard drive, a server, a network switch, or any other computing component. Appropriate infrastructure may be included to allow communication between the electrical component 151 of the sled 105 and the enabling key component 131 of the key cartridge 107.

The enabling key component 131 may be a hardware component that enables functionality of the electrical component 151. The electrical component 151 may have functionality that is not available when connection with the enabling key component 131 is severed (or when coupling with the enabling key component 131 is otherwise absent). In one example, the enabling key component 131 includes a storage medium (e.g., a microchip, a hardware authentication device) that contains information for a cryptographic key that enables decryption of data on the electrical component 151. In this example, when the enabling key component 131 is present, the data of the electrical component 151 is decrypted using the cryptographic key and made available for access or use by other elements of the system 101, such as processors, RAM, network cards, or other components within the sled 105 and/or components outside of the sled 105 (e.g., through a port 153 in the sled 105 that provides connection to or from the electrical component 151). Other forms of enabling key component 131 may also be utilized, however, including, but not limited to, arrangements in which the enabling key component 131 includes platform firmware and/or software, drive firmware, the baseboard management controller (BMC), the basic input/output system (BIOS) or other elements without which functionality of the electrical component will be prevented or diminished. The enabling key component 131 may include, for example, a printed circuit board, electronic components, or any other suitable structure for enabling a corresponding function. In some embodiments, the enabling key component 131 may be included in or coupled with a board or other structure that may also be capable of other (e.g., automated) functions, such as checking for compatibility of the enabling key component 131 with components of the sled 105, or controlling other elements of the key cartridge 107 such as the indicator light 143 or the destruction mechanism 135.

Various elements of the key cartridge 107 may perform various functions based on movement of the key cartridge 107. For example, the key cartridge 107 may be movable between an accessible position that permits access to the latch release mechanism 113 (e.g., as shown in FIG. 3 and relative to the bottom-most sled 105 in FIG. 1) and a blocking position that obstructs access to the latch release mechanism 113 (e.g., as shown in FIG. 1 relative to the top-most sled 105).

In some embodiments, movement of the key cartridge 107 in an installation direction (e.g., from the accessible position to the blocking position, and as illustrated by the arrow 157) may have a number of effects. For example, movement in the installation direction 157 may cause the base portion 123 of the housing 121 to cover or otherwise block access to the latch release mechanism 113. Thus, when the key cartridge 107 is properly positioned on the front of the sled 105, the latch release mechanism 113 cannot be activated, and the sled 105 cannot be removed from the rack or other structure in which the sled 105 is mounted.

Movement in the installation direction 157 may bring the alignment feature 141 into engagement with a mating alignment element 161. For example, the alignment feature 141 and the mating alignment element 161 may collectively correspond to a post and a matching aperture. One or both of the alignment feature 141 and the mating alignment element 161 may include a taper, ramp, or other guiding surface that may help align the key cartridge 107 so other features (such as the electrical connector 133 and/or locking member 139) will be aligned for engagement. In some embodiments, engagement of the alignment feature 141 with a mating alignment element 161 may additionally or alternatively act as strain relief features that can alleviate wear and tear or negative impacts on other engaging elements of the system 101.

Movement in the installation direction 157 may bring the electrical connector 133 into a position of establishing electrical connection. For example, the electrical connector 133 may be coupled with the enabling key component 131 and provide at least a portion of an interface by which the enabling key component 131 can be releasably electrically coupled with the electrical component 151 of the sled 105. As a non-limiting example, the electrical connector 133 may include one or more gold or other conductive traces on a substrate extending from a board that includes or corresponds to the enabling key component 131, although any electrical connector of suitable materials and/or form factor may be utilized, including, but not limited to interfaces that include wires or forms of communication other than the directly attached relationship between the enabling key component 131 and the electrical connector 133 depicted in FIG. 3.

In FIG. 3, the electrical connector 133 is sized and positioned to engage a mating electrical connective element 163 that in turn provides connection to a control unit 165

(described further below), which in turn is coupled with a motherboard 155 to provide connection through suitable interfaces (not shown) to the electrical component 151 of the sled 105. In some embodiments, the motherboard 155 or other elements may provide connection from the electrical component 151 to other elements within the sled 105 in addition to or in lieu of the port 153 referenced previously. The system 101, however, is not limited to the particular arrangement or set of interfaces depicted in FIG. 3 and may have more or fewer wires, connections, couplers, or other intervening structures between the enabling key component 131 and the electrical component 151 of the sled 105.

Movement in the installation direction 157 may bring the locking member 139 into engagement with a mating locking element 169. Engagement of the locking member 139 with the mating locking element 169 may releasably retain the key cartridge 107 in an installed state relative to the sled 105 (e.g., retaining the electrical connection provided by the electrical connector 133). Although the locking member 139 and the mating locking element 169 are shown as a movable prong and a slot that can engage one another, any other combination of detents, hooks, or other locking structures may be utilized. Moreover, although the key cartridge 107 is shown with various projections that mate with recesses of the sled 105, respective features may include projections from the sled 105 and recesses on the key cartridge 107 additionally or alternatively.

The control unit 165 (FIG. 3) may interact with the enabling key component 131 and control the electrical component 151 of the sled 105 based on the interaction with the enabling key component 131. For example, the control unit 165 may correspond to an element added to the sled 105 for the purposes of retrofitting or otherwise establishing an appropriate arrangement between the enabling key component 131 and the electrical component 151 to facilitate the respective functions described herein. The control unit 165 may include, for example, a printed circuit board, electronic components (e.g., a microprocessor, a microcontroller), software instructions, and/or any other suitable structure for enabling a corresponding function.

In FIG. 3, the control unit 165 is shown supported by a mounting bracket 167. Although the mounting bracket 167 is shown supporting the control unit 165 relative to a side of the sled 105, other arrangements are also possible, including, but not limited to arrangements in which the mounting bracket 167 is coupled to one or both of the top or bottom of the sled 105. In some embodiments, the mounting bracket 167 may be sized and/or positioned to avoid necessitating the removal of—or otherwise interfering with—other brackets for holding other cards or other structures within the sled 105.

As noted previously, the key cartridge 107 can include a destruction mechanism 135 (e.g., as shown in FIG. 2A). The destruction mechanism 135 may be capable of destroying or permanently disabling the enabling key component 131. For example, if the enabling key component 131 is an integrated circuit that stores an encryption key used to encrypt and decrypt data stored on the sled 105, the destruction mechanism 135 can be used to damage the enabling key component 131 and make the encryption key unavailable (perhaps permanently). Such destruction, for example, may be useful when the key cartridge 107 has been removed from a sled 105, such as when a sled 105 is to be transported to another location and it is desired to prevent meaningful access en route. The destruction mechanism 135 is shown in FIG. 3 as including a screw arranged to pierce, crush, impact, grind, or deform the enabling key component 131 upon driving the screw, although any structure suitable for erasing data stored on the enabling key component 131 and/or destroying or permanently disabling the enabling key component 131 may be used additionally or alternatively. Other examples may include a spring-loaded pin, a driving member, or other mechanical or electrical components capable of logically (e.g., erasing memory) or physically destroying or disabling the enabling key component 131 (whether user-activated or automatically activated). In some embodiments, the destruction mechanism 135 may destroy or disable a particular portion of the structure of the enabling key component 131 without disabling other portions (such as disabling a portion having a cryptographic key or other enabling aspect without disabling a portion that may be capable of checking compatibility or controlling the indicator light 143, among other possibilities).

In FIG. 2A, the destruction mechanism 135 further has an activating interface 175. The activating interface 175 in FIG. 2A is depicted as a tool interface for driving the screw but may additionally or alternatively correspond to a button, lever, or any other interface by which the destruction mechanism 135 may be activated and/or operated. The activating interface 175 may be located to avoid inadvertent destruction while the key cartridge 107 is engaged with the sled 105. In particular, the activating interface can be arranged to be blocked by the sled 105 or the rack 103 when the key cartridge 107 is in an installed state relative to the sled 105. One such example placement is further illustrated by the upper sled in FIG. 1, where access to the activating interface 175 is blocked by a wall of the rack 103 when the key cartridge 107 is installed relative to the sled 105 that has been seated in the rack 103. In contrast, adjacent the lower sled in FIG. 1, the activating interface 175 is shown accessible on the key cartridge 107 that has been removed from the sled 105.

In some embodiments, the destruction mechanism 135 may be automatically triggered without physical manipulation of an activating interface 175 by a user. For example, the destruction mechanism 135 may be triggered by detachment of the key cartridge 107, such as in response to detection by the enabling key component 131 or associated board or other element in the key cartridge 107 that the electrical connector 133 has been disconnected, or based on limit switches, or any other combination of components capable of detecting detachment of the key cartridge 107. In some embodiments, the activating interface 175 may be omitted, including, but not limited to, embodiments in which the destruction mechanism 135 is automatically triggered, or embodiments in which the key cartridge 107 is to be re-used or disabled by elements separate from the key cartridge 107.

Various other elements shown in FIG. 2A may supplement the destruction mechanism 135. For example, the visual indicator 137 may be positioned to allow visual confirmation of destruction of the enabling key component 131. In some embodiments, destruction may be visually confirmed by looking through the visual indicator 137, such as if the visual indicator corresponds to a viewing window through which the enabling key component 131 may be seen. Additionally or alternatively, the visual indicator may also crack or otherwise exhibit a changed characteristic in response to action by the destruction mechanism 135 continuing through the enabling key component 131 to also act on the visual indicator 137 as well in a manner that may provide visual confirmation of activity of the destruction mechanism 135 by inspecting the state of the visual indicator 137.

The reinforcing plate 145 may correspond to a material that provides additional strength relative to other material of the key cartridge 107, for example, so that the housing 121 may resist buckling under forces applied to the activating interface 175 and instead allow forces to be primarily expended in destroying the enabling key component 131. In some embodiments, the reinforcing plate 145 is a metal material that overlays a plastic material of the housing 121, although any other combination of materials may be utilized.

The indicator light 143 may turn on or off or otherwise toggle between states to indicate changes of condition relative to the key cartridge 107. In some embodiments, the indicator light 143 may indicate when power is being supplied to the enabling key component 131. In some embodiments, the indicator light 143 may indicate when the enabling key component 131 is coupled with or otherwise acting on the electrical component 151. In some embodiments, the indicator light 143 may provide an indication about when the destruction mechanism 135 has been activated or otherwise utilized. In some embodiments, the indicator light 143 may switch between different states to indicate compatibility with the sled 105, e.g., turning on or to a first color if the enabling key component 131 includes the correct cryptographic key or other enabling feature for the particular sled 105, or turning off or to a second color if the enabling key component 131 includes a cryptographic key that is not a match or is otherwise not enabling for that particular sled 105.

As previously noted, destroying the enabling key component 131 of the key cartridge 107 may disable functionality of the electrical component 151 of the sled 105 in the absence of a suitable replacement. To facilitate locating a suitable replacement by authorized personnel, the housing 121 may include a label 177 or other indicia with an identifier corresponding to the particular configuration of enabling key component 131 to accompany a particular sled 105 and/or electrical component 151.

FIG. 4 is a flowchart illustrating an example process 400 involving installation of a key cartridge 107 according to certain embodiments.

At 410, the process 400 can include accessing a sled. For example, this may involve a technician accessing a sled 105 in a datacenter or other relevant environment.

At 420, the process 400 can include seating the sled in a rack. For example, this may entail the sled 105 traveling along the rails 109 to a seated position within the rack 103.

At 430, the process 400 can include latching the sled in the seated position. For example, this may entail the latch member 111 actuating to latch the sled 105 and secure it in the seated position in the rack 103. In some embodiments, the sled 105 may be secured to another sled 105 or otherwise be secured in place and/or indirectly coupled with the rack 103.

At 440, the process 400 can include aligning a key cartridge. For example, this may entail the alignment feature 141 of the key cartridge 107 interacting with the mating alignment element 161 to arrange other features of the key cartridge 107 for respective alignment with respective elements of the sled 105.

At 450, the process 400 can include covering a latch release with a key cartridge housing. For example, this may entail the base portion 123 and/or other pertinent part of the housing 121 of the key cartridge 107 covering or otherwise obstructing access to the latch release mechanism 113. The action at 450 may correspond to receiving the key cartridge 107 into a blocking position that blocks access to the latch release mechanism 113. Thus, the sled cannot be removed from the rack while the key cartridge 107 is blocking the latch release mechanism 113.

At 460, the process 400 can include electrically connecting the key cartridge to an electrical component. For example, this may entail the electrical connector 133 engaging the mating electrical connective element 163 to establish electrical connection between the enabling key component 131 of the key cartridge 107 and the electrical component 151 of the sled 105.

At 470, the process 400 can include physically securing the key cartridge. For example, this may entail the locking member 139 engaging the mating locking element 169 to secure the key cartridge 107 relative to the sled 105.

At 480, the process 400 can include enabling functionality of the electrical component via the key cartridge. For example, this may entail the enabling key component 131 of the key cartridge 107 interacting (e.g., via the electrical connector 133 and/or the control unit 165) with the electrical component 151 to enable functionality of the electrical component 151. As an illustrative example, this may include data stored on the electrical component 151 being decrypted based on information provided by the enabling key component 131.

One or more of the aforementioned acts of the process 400 may be in response to movement of the key cartridge 107 in an installation direction 157 toward the sled 105 (e.g., from or away from an accessible position that permits access to the latch release mechanism 113 and to or toward a blocking position that blocks access to the latch release mechanism 113). Thus, for example, the alignment at 440, the covering at 450, the electrically connecting at 460, the physically securing at 470, and/or the enabling at 480 may individually and/or in some respective combination simultaneously or successively occur as the key cartridge 107 moves in the installation direction 157.

Variations on the process 400 are also possible. As one example, in some embodiments, the cartridge 107 may be coupled with the sled 105 prior to seating the sled 105, for example, such that some of the described actions (e.g., aligning the key cartridge 107 at 440, covering the latch release at 450, engaging the electrical connector 133 at 460, physically securing the key cartridge 107 at 470, and/or enabling functionality at 480) can occur before one or more of the actions of seating the sled 105 at 420 and/or latching the sled 105 at 430. For example, in some embodiments, the sled 105 may be shipped with the key cartridge 107 pre-installed, such that a customer need only remove the sled 105 with pre-installed key cartridge 107 from shipping packaging and insert the combined assembly into a rack 103 for seating and use with all functionality enabled until removing the key cartridge 107 to remove the sled 105 for de-commissioning.

FIG. 5 is a flowchart illustrating an example process 500 involving removal of a key cartridge 107 according to certain embodiments. The process 500 may be a continuation of the process 400, e.g., with at least some of the acts of process 400 being performed before the acts of process 500.

At 510, the process 500 can include physically releasing a key cartridge. For example, this may entail the locking member 139 disengaging to allow release or detachment of the key cartridge 107 from the sled 105. Detaching the key cartridge 107 may cause and/or facilitate one or more subsequent actions in the process 500. For example, detaching the key cartridge may both expose the latch release mechanism 113 (e.g., to facilitate unlatching the sled at 560)

and also cause or facilitate severing of the electrical connection (as at 520) between the electrical component 151 and the enabling key component 131 so that corresponding functionality (such as decryption) is disabled (e.g., as at 530). In terms of directionality, detaching the key cartridge 107 at 510 may be in response to the key cartridge 107 being repositioned to or toward an accessible position that permits access to the latch release mechanism 113 and from or away from a blocking position that blocks access to the latch release mechanism 113 (e.g., in a direction contrary to that shown by arrow 157).

At 520, the process 500 can include electrically disconnecting the key cartridge from the electrical component. For example, this may entail the electrical connector 133 disengaging to sever an electrical connection between the enabling key component 131 within the key cartridge 107 and the electrical component 151 situated within the sled 105. The severing may also be in response to the key cartridge 107 being repositioned to the accessible position from the blocking position (e.g., in a direction contrary to that shown by arrow 157).

At 530, the process 500 can include disabling electronic device functionality as a result of disconnecting the key cartridge. For example, this may entail the functionality of the electrical component 151 being disabled in response to the electrical connection with the enabling key component being severed at 520. As an illustrative example, if the enabling key component 131 includes a cryptographic key for decryption of data on the electrical component 151, the severing of the electrical connection with the enabling key component 131 may cause the electrical component 151 to be disabled by leaving the electrical component 151 in an encrypted state.

At 540, the process 500 can include removing the key cartridge from covering the latch release. For example, this may entail the housing 121 of the key cartridge 107 being moved away from the latch release mechanism 113. Such movement may correspond to the key cartridge 107 being repositioned to or toward the accessible position from or away from the blocking position (e.g., in a direction contrary to that shown by arrow 157). In some embodiments, movement of the key cartridge 107 to or toward the accessible position from or away from the blocking position further allows access to the activating interface 175 of the destruction mechanism 135.

At 550, the process 500 can include destroying or otherwise permanently de-commissioning the key cartridge. For example, this may entail the destruction mechanism 135 operating to pierce, destroy, or otherwise disable the enabling key component 131. In some embodiments, the operation at 550 may be optional, for example, the enabling key component 131 may alternatively be retained for subsequent use.

At 560, the process 500 can include unlatching the sled. For example, this may entail operating the latch release mechanism 113 (e.g., which has been exposed based on the removal of the housing 121 of the key cartridge 107 at 540) to release the sled 105 from the rack 103.

At 570, the process 500 can include removing the sled from the rack. For example, this may entail removing the sled 105 from the rack 103 (e.g., which may have been facilitated by the latch release mechanism 113 having released the latch member 111 at 560). Removing the sled 105 at 570 can include removing the sled 105 from the rack with the electrical component 150 in an encrypted (or otherwise disabled) state as a result of the electrical disconnection at 520 and/or the disabling at 530.

At 580, the process 500 can include re-locating the sled. For example, this may entail the sled 105 (e.g., which was removed from the rack 103 at 570) being re-located to another location such as another rack and/or another datacenter. In some embodiments, the sled 105 may be at low risk for meaningful unauthorized access during such transfer based on the sled 105 being disabled at 530 and unlikely to be re-enabled without access to suitable information about what form of enabling key component 131 would permit re-enabling.

At 590, the process 500 can include coupling the sled with the same or a new key cartridge or enabling key component. In some embodiments, this may entail re-coupling the key cartridge 107 if not destroyed etc. at 550, such as if the key cartridge 107 were instead sent or re-located to the new location of the sled 105 separately from the sled 105. In some embodiments, the action at 590 may include utilizing a replacement key cartridge 107 or enabling key component 131, such as may be generated or obtained by looking up information stored in relation to an indicia or label 177 of the original key cartridge 107 and/or based on other information that may have been stored by an authorized entity about the original key cartridge 107.

In an illustrative example, the key cartridge 107 stores an encryption key (e.g., within the enabling key component 131) for data stored on a server computer (e.g., which may correspond to the electrical component 151). In use, a service provider may accordingly send the server computer to a customer, for example, separate from the key cartridge 107. Since the server computer is transported without the key cartridge 107, the data on the server computer can be expected to remain encrypted during transit. Such encryption may thus mitigate concerns that might otherwise arise about the possibility of interception and meaningful access to the data on the server—for even if the server were intercepted, the data would still be encrypted and thus effectively meaningless to the interceptor. Upon receipt of the server computer, the customer can install the server computer within the customer's datacenter or other relevant infrastructure and simply connect the separately obtained key cartridge 107 to enable use of the server computer, e.g., with any data and/or software included by the service provider on the server computer. The key cartridge 107 may thus remain in place for the useful life of the server computer. When such useful life comes to an end or there arises any other reason to decommission the server computer, the user removes the key cartridge 107 to gain access to the latch release mechanism 113 so that the server computer can be removed from its associated infrastructure, such as the rack 103. This removal of the key cartridge 107 disables the decryption, rendering the data on the server computer once again encrypted and effectively inaccessible (e.g., appearing as gibberish to any attempts to re-access the server computer without the key cartridge 107 and its particular encryption key). To ensure security of the decommissioned server computer, the user utilizes the destruction mechanism 135 to destroy the part that holds the encryption key, which eliminates any ability to later meaningfully re-access the server computer for the data it contained. The decommissioned server computer may then be safely disposed of without concern for potential intercepting or re-accessing of the data during the disposal process. Alternatively, the decommissioned server computer may be returned to the service provider (e.g., again without concern about meaningful unauthorized access en route in light of the encryption), and the service provider may wipe the encrypted data to make room for a new set of encrypted data that can be secured by a new unique cryptographic key within a new key cartridge 107 to allow the physical components to be re-used beyond the useful life of the initial set of data, for example.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
installing, into a rack, a sled containing a server computer, wherein the sled is secured in place by a latch that is releasable by operation of a latch release mechanism;
arranging a housing of a key cartridge over the latch release mechanism, such that the housing blocks access to the latch release mechanism, wherein the key cartridge contains a cryptographic key within the housing;
inserting an electrical connector of the key cartridge into the sled so as to establish an electrical connection between the server computer and the cryptographic key within the housing, the cryptographic key enabling decryption of data on the server computer while the housing of the key cartridge is arranged over the latch release mechanism and blocks access to the latch release mechanism;
detaching the key cartridge so as to both expose the latch release mechanism and sever the electrical connection between the server computer and the cryptographic key so that decryption is disabled;
operating the latch release mechanism to release the sled from the rack; and
removing the sled from a seated position with the server computer in an encrypted state as a result of the electrical connection between the server computer and the cryptographic key being severed.

2. The method of claim 1, wherein the arranging of the housing and the inserting of the electrical connector each occur prior to the installing the sled into the rack.

3. The method of claim 1, further comprising, subsequent to detaching the key cartridge, making the cryptographic key stored within the key cartridge unreadable by operation of a destruction mechanism included in the key cartridge.

4. A system, comprising:
a pluggable key cartridge comprising:
a housing sized for placement at least partially over or around a latch release mechanism of a slidable rack sled and in a position to obstruct access to the latch release mechanism;
an enabling key component positioned within the housing, the enabling key component enabling operation of an electrical component situated within the slidable rack sled when in electrical connection with the electrical component, the enabling key component disabling operation of the electrical component when disconnected from the electrical component, wherein the enabling key component comprises a storage medium containing a cryptographic key for enabling decryption of data on the electrical component situated within the slidable rack sled; and
an electrical connector coupled with the enabling key component and sized and positioned for establishing electrical connection between the enabling key component and the electrical component situated within the slidable rack sled when the pluggable key cartridge is installed relative to the slidable rack sled.

5. The system of claim 4, further comprising at least one of:
the slidable rack sled;
the latch release mechanism; or
the electrical component situated within the slidable rack sled.

6. The system of claim 4, further comprising a control unit situated within the slidable rack sled, the control unit interacting with the enabling key component and controlling the electrical component based on the interaction with the enabling key component when the pluggable key cartridge is installed relative to the slidable rack sled.

7. The system of claim 4, wherein the pluggable key cartridge further comprises a destruction mechanism that upon operation destroys or permanently disables the enabling key component.

8. The system of claim 7, wherein the destruction mechanism comprises a screw arranged to pierce or crush the enabling key component upon driving of the screw.

9. The system of claim 7, wherein the destruction mechanism comprises an activating interface arranged to be blocked by the slidable rack sled or an associated rack when the pluggable key cartridge is in an installed state relative to the slidable rack sled.

10. The system of claim 7, wherein the pluggable key cartridge further comprises a visual indicator for confirmation of operation of the destruction mechanism to destroy or permanently disable the enabling key component.

11. The system of claim 4, wherein the pluggable key cartridge further comprises a locking member retaining the pluggable key cartridge in an installed state relative to the slidable rack sled.

12. The system of claim 4, wherein the pluggable key cartridge further comprises an alignment feature configured to engage the slidable rack sled to align the electrical connector for seating.

13. The system of claim 4, wherein the pluggable key cartridge further comprises an indicator light.

14. A method comprising:
 detaching a key cartridge from a front of a slidable rack sled, wherein the detaching the key cartridge from the slidable rack sled exposes a latch release mechanism of the slidable rack sled, wherein the key cartridge contains an enabling key component within the key cartridge; and
 as a result of the detaching, disengaging an electrical connector of the key cartridge from the slidable rack sled to sever an electrical connection between the enabling key component within the key cartridge and the slidable rack sled, wherein an electrical component of the slidable rack sled is disabled in response to the electrical connection with the enabling key component being severed, wherein the enabling key component comprises a cryptographic key for decryption of data on the electrical component such that the severing of the electrical connection with the enabling key component causes the electrical component to be disabled by leaving the electrical component in an encrypted state.

15. The method of claim 14, further comprising, prior to the detaching, receiving the key cartridge into a blocking position and to establish the electrical connection.

16. The method of claim 14, wherein the detaching the key cartridge further allows access to an activating interface of a destruction mechanism configured to destroy or permanently disable the enabling key component.

17. The method of claim 14, further comprising releasing the slidable rack sled from an associated rack by actuation of the latch release mechanism subsequent to the key cartridge being repositioned to an accessible position from a blocking position.

\* \* \* \* \*